United States Patent [19]

Santillie et al.

[11] Patent Number: 4,618,479
[45] Date of Patent: Oct. 21, 1986

[54] APPARATUS FOR PRODUCING CHLORINE DIOXIDE

[75] Inventors: Paul W. Santillie, Richland; Daniel M. Ramras, Seattle, both of Wash.

[73] Assignee: Lamb-Weston, Inc., Portland, Oreg.

[21] Appl. No.: 573,463

[22] Filed: Jan. 24, 1984

Related U.S. Application Data

[62] Division of Ser. No. 313,256, Oct. 21, 1981, Pat. No. 4,451,444.

[51] Int. Cl.$^4$ .................. B01J 8/02; C01B 11/02; F28D 21/00
[52] U.S. Cl. .................. 422/202; 261/153; 422/211; 422/220; 423/480
[58] Field of Search ............. 422/202, 220, 256, 110, 422/111, 211; 423/478–480; 261/122, 153

[56] References Cited

U.S. PATENT DOCUMENTS

| 2,095,473 | 10/1937 | Keunecke | 261/122 X |
| 2,639,129 | 5/1953 | Rosset | 261/122 X |
| 3,663,574 | 5/1972 | Yamagishi et al. | 422/202 X |
| 3,864,456 | 2/1975 | Winfield et al. | 423/504 X |
| 3,901,660 | 8/1975 | Ohorodnik et al. | 422/202 X |
| 4,105,725 | 8/1978 | Ross | 261/122 |
| 4,105,751 | 8/1978 | Caillol | 423/480 X |
| 4,234,446 | 11/1980 | Ramras | 423/477 X |
| 4,247,531 | 1/1981 | Hicks | 423/477 |
| 4,250,144 | 2/1981 | Ratigan | 423/477 X |
| 4,250,159 | 2/1981 | Cowley | 423/480 |

FOREIGN PATENT DOCUMENTS

| 0533803 | 11/1956 | Canada | 423/480 |
| 0537091 | 2/1957 | Canada | 423/480 |

Primary Examiner—Barry S. Richman
Assistant Examiner—Brion P. Heaney
Attorney, Agent, or Firm—Klarquist, Sparkman, Campbell, Leigh & Whinston

[57] ABSTRACT

A continuous method and apparatus for the efficient production of gaseous chlorine dioxide by the reaction between gaseous sulfur dioxide and an aqueous solution of a metallic chlorate. The chlorate solution and a highly concentrated sulfur dioxide gas are introduced into a packed columnar chamber at closely adjacent locations at the bottom of the chamber so as to flood the chamber and maximize both the contact area and contact time of the two reactants. Throughout the reaction the chamber is subjected to high vacuum imposed by an eductor which exhausts the chlorine dioxide gas and spent reactants. For use of the chlorine dioxide to produce potable water or treat foodstuffs, the chlorine dioxide and spent reactants are exhausted from the chamber separately by respective eductors substantially balanced with respect to each other to impose comparable vacuums upon the chamber. Because of the high efficiency of the reaction, substantial heat is generated therefrom which is absorbed by a coolant flowing through a jacket surrounding the chamber. The flow rate of the coolant and flow rate of the reactants into the chamber are proportional due to the dependency of the reactant flow rate on the coolant flow rate.

6 Claims, 2 Drawing Figures

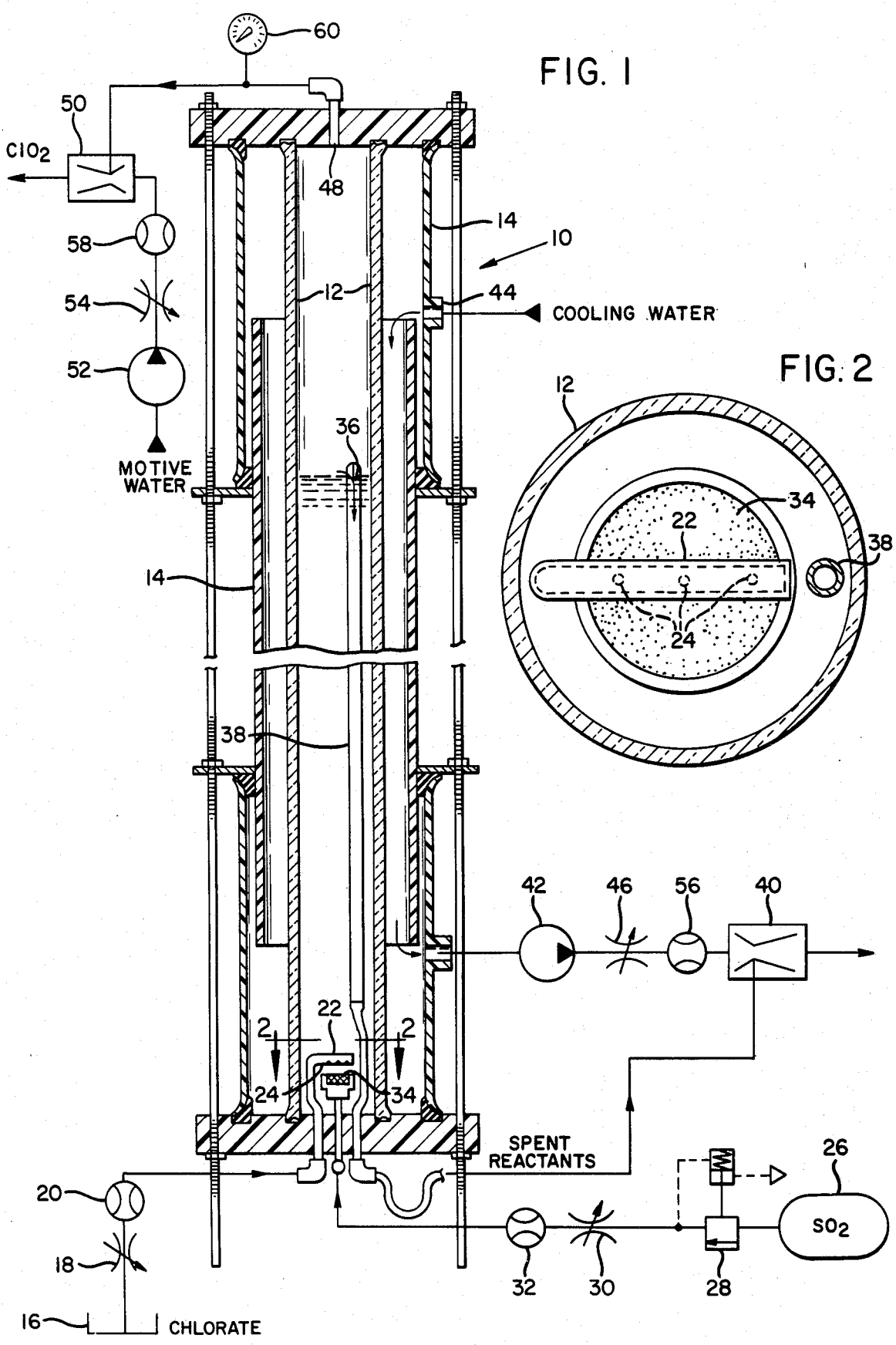

APPARATUS FOR PRODUCING CHLORINE DIOXIDE

This is a division, of application Ser. No. 06/313,256 filed Oct. 21, 1981, now U.S. Pat. No. 4,451,444.

BACKGROUND OF THE INVENTION

The present invention is directed to a continuous and exceptionally efficient method and apparatus of producing gaseous chlorine dioxide by the reaction between gaseous sulfur dioxide and an aqueous solution of a metallic chlorate.

In the past, a number of commercial methods have been developed for producing chlorine dioxide for use primarily as a bleaching agent and disinfectant. One such method involves the interaction of a metallic chlorate (usually sodium chlorate) and a strong acid, with or without an accompanying chloride, as described in the following U.S. Pat. Nos. 2,664,341; 2,863,722; 3,563,702; 3,789,108; 3,974,266. However the relative chemical inefficiency, resultant high cost of chemicals, hazards from "puffing" (explosions caused by spontaneous decomposition of the chlorine dioxide) and the accompanying generation of usually unwanted chlorine all detract from the desirability of this method. In this connection, U.S. Pat. No. 2,481,241 addresses the need for separating the unwanted chlorine produced by this method from the chlorine dioxide.

Another commercial method which has been practiced in the past produces chlorine dioxide by reacting sodium chlorite either with chlorine gas or a combination of sodium hypochlorite and a strong acid, as shown in the following U.S. Pat. Nos. 4,234,446; 4,247,531; 4,250,144. Unfortunately sodium chlorite is approximately four to five times as costly as sodium chlorate, which renders the method too costly.

A third method utilizes an intermediate reductant such as methanol or sulfur dioxide in combination with a metallic chlorate, usually sodium chlorate, as shown in the following U.S. patents the disclosures of which are hereby incorporated by reference: U.S. Pat. Nos. 2,481,240; 2,598,087; 3,950,500; 4,250,159. Such method is desirable because it utilizes the relatively inexpensive chlorate reactant, and normally does not produce unwanted chlorine gas. However the chemical inefficiency of the method in the past, and its hazards from possible "puffing", have remained as serious drawbacks. Moreover, it has not been known how to improve the efficiency of the method without also increasing the safety hazards incident to "puffing" and high heat generation which would accompany any such increase in efficiency. Nor is it known how to improve the efficiency of the reaction compatibly with generation of the chlorine dioxide in a form free from the spent reactants, so that the chlorine dioxide may be used for producing potable water or treating foodstuffs.

SUMMARY OF THE INVENTION

The present invention solves the chemical inefficiency and resultant expense problems inherent in previous methods of generating chlorine dioxide by the reaction of a metallic chlorate with gaseous sulfur dioxide. It accomplishes this by multiple novel combinations of steps, each combination being effective by itself to cause an incremental increase in efficiency and the combined combinations causing a truly significant increase in overall efficiency.

First, the previous requirement of a high degree of dilution of the sulfur dioxide gas with air or nitrogen, to a concentration of not over 20% to avoid "puffing", is eliminated by the imposition of a high degree of vacuum, i.e. at least four times the 100 millimeters Hg suggested by U.S. Pat. No. 4,250,159, so as to totally eliminate the "puffing" danger without need for diluting the sulfur dioxide gas which otherwise hinders the effective contact between the chlorate and sulfur dioxide reactants.

Second, the previous countercurrent or cocurrent trickling flow techniques, whereby the chlorate solution was introduced at the top of the reaction chamber and permitted to trickle downwardly, with the spent reactants being exhausted at the bottom of the chamber, have been abandoned in favor of a flooding technique whereby the spent reactants are exhausted at a location adjacent the top of the reaction chamber. Both the chlorate solution and the sulfur dioxide are introduced closely adjacent to each other at the bottom of the chamber with the sulfur dioxide bubbling upwardly through the flooded, packed reaction chamber so as to increase the contact time of both reactants prior to their exhaust and thereby render the reaction more complete. Moreover the exhaust of spent reactants at a location removed from the point of entry of the sulfur dioxide, rather than adjacent to the point of entry as in most other processes, thereby prevents the removal of sulfur dioxide from the chamber before it has had an opportunity to react properly. Since the use of flooding rather than trickling removes the desirable maximizing of chlorate solution surface area as taught by U.S. Pat. No. 2,481,240, previously thought necessary to avoid the counterproductive reaction of excess sulfur dioxide with the chlorine dioxide gas produced, the present invention provides a substitute means of maximizing the reaction surface area by providing a high degree of diffusion of the sulfur dioxide gas so as to form extremely small bubbles thereof, which maximizes the ratio between their surface area and volume.

Each of these efficiency-enhancing combinations contributes individually toward a very substantial overall increase in the efficiency of chlorine dioxide generation obtainable by use of the present invention. Although one of the foregoing features, i.e. high diffusion of the gaseous reactant to form small bubbles, has previously been recognized as a means of increasing reaction efficiency, this feature has not by itself produced sufficient improvements in efficiency because it has not been used in combination with a flooded chamber where the reactants are introduced at the bottom thereof in close proximity to each other and exhausted at the top thereof, nor in combination with such a high vacuum that no air or nitrogen dilution of the sulfur dioxide is required.

A further potential problem requiring solution is the high degree of heat generated by the exceptionally efficient reaction when carried out in accordance with the efficiency-enhancing features of the present invention. Since the chlorine dioxide can be generated at varying rates of production depending upon varying rates of reactant input, it is desirable that the heat-removal capacity of the system be automatically variable in proportion to these other variables. In the present invention this is accomplished by utilizing the coolant, flowing through a cooling jacket surrounding the reaction chamber, as the sole source of motive fluid through an eductor which imposes vacuum upon the chamber.

By making the input flow rate of reactants proportional to the degree of vacuum imposed upon the chamber, which in turn is proportional to the flow rate of coolant through the eductor, a proportional relationship is automatically established between reactant flow rate and coolant flow rate.

For use of the chlorine dioxide as a disinfectant to produce potable water or to treat foodstuffs, it is desirable that the chlorine dioxide be separated from the spent reactants. In order to accomplish this, separate eductors are utilized according to the present invention to impose the aforementioned vacuum on the chamber while exhausting the chlorine dioxide and spent reactants separately. The use of separate eductors as taught herein is applicable not only to the chlorate—sulfur dioxide method of chlorine dioxide generation, but also to the other chemical reaction methods described previously. However the exceptionally high vacuum required to eliminate the need for air or nitrogen dilution of the sulfur dioxide, as discussed above, presents certain special problems in the use of multiple eductors which must be overcome. One of these problems is the adverse result from any imbalance between the vacuum levels of the respective eductors. Where merely a low level of vacuum is imposed, the maximum imbalance possible is small enough that it can be effectively negated by the head of liquid in the reaction chamber. However, with the high levels of vacuum contemplated in the present invention, the maximum possible imbalance can be far greater so as to cause malfunction, particularly if the reaction chamber is a compact one with a relatively small head of liquid as in the present invention. Accordingly, the present invention provides adjustable means for finely balancing the relative vacuums imposed on the reaction chamber by the respective eductors, for use in those particular instances when the chlorine dioxide must be exhausted from the reaction chamber separately from the spent reactants. While such separation would not normally be needed for certain industrial uses such as bleaching, it is understood that it is quite necessary for the production of potable water or the treatment of foodstuffs.

It is therefore a primary objective of the present invention to increase substantially the chemical efficiency of producing chlorine dioxide from the reaction between an aqueous solution of a metallic chlorate and gaseous sulfur dioxide.

It is a further objective of the present invention to increase such chemical efficiency without thereby increasing the danger of explosion due to "puffing" of the chlorine dioxide.

It is a further objective of the present invention to provide a cooling system for the reaction chamber wherein the coolant flow rate and reactant flow rates are proportionally interdependent.

It is a further objective of the present invention to separate the chlorine dioxide so produced from the spent reactants so as to render such chlorine dioxide suitable for the production of potable water or the treatment of foodstuffs.

It is a further objective of the present invention to provide for the removal of chlorine dioxide from the reaction chamber separately from the spent reactants while maintaining an unusually high vacuum upon the reaction chamber in accordance with the foregoing efficiency-enhancement objective.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a partially schematic, sectional side view of an exemplary embodiment of a reactor suitable for carrying out the present invention.

FIG. 2 is an enlarged sectional view of the reactant input portion of the reactor, taken along line 2—2 of FIG. 1.

DESCRIPTION OF THE PREFERRED EMBODIMENT

The present invention produces chlorine dioxide from the reaction between gaseous sulfur dioxide and an aqueous solution of a metallic chlorate. Sodium chlorate is the preferred reactant; however other chlorates such as magnesium chlorate, lithium chlorate, aluminum chlorate, potassium chlorate or calcium chlorate could possibly be used, depending upon the relation between their solubility and current cost which is determined by market conditions. Since the use of calcium chlorate produces calcium sulfate which is insoluble in water, plugging of the reaction chamber is likely to occur unless some means is devised for removing this substance.

The preferred reactor, indicated generally as 10, for generating the chlorine dioxide comprises a columnar cylindrical reaction chamber 12 surrounded by a cooling jacket 14. An aqueous chlorate solution contained in a reservoir 16 is fed through a variable restriction 18, such as a variable-length capillary tube or other suitable flow-regulating restriction, through a flow meter 20 into the bottom of the reaction chamber where it is emitted through a tube 22 having downwardly-facing perforations 24. The other reactant, gaseous sulfur dioxide, is fed from a reservoir 26 through a vacuum-responsive cutoff valve 28, a variable restriction 30 and a flow meter 32 to a diffuser 34 capable of forming the sulfur dioxide into extremely small bubbles of approximately 100 microns in diameter. The diffuser 34 preferably comprises a circular plate approximately five centimeters thick constructed of bonded Carborundum granules. Such diffuser is commercially available under the designation "Grade 40 Acid Bond A-501 Aloxite".

It will be noted that the diffuser 34 is located closely adjacent to the downwardly-directed perforations 24 of the chlorate input tube 22 so as to encourage immediate reaction of the chlorate and sulfur dioxide and thereby maximize their contact time in the reaction chamber 12 so as to enhance the efficiency of the generation process. This represents an abandonment of the counter-current reactant flow principle which has been previously predominantly used and which was detrimental to the efficiency of the reaction. The sulfur dioxide entering through the diffuser 34 is of far greater concentration than the maximum 20% mixture of sulfur dioxide with air or nitrogen which has previously been thought necessary. In fact, the concentration of sulfur dioxide in the present process is preferably 100%. The higher concentration maximizes the contact area and contact time of the two reactants thereby increasing the efficiency, and is made possible without exposing the generation process to the dangers of "puffing" because of the high level of vacuum imposed on the reaction chamber, as discussed hereafter.

The reaction between the chlorate and sulfur dioxide takes place in the reaction chamber 12 during the upward movement of both the chlorate and the sulfur dioxide bubbles toward the exhaust port 36 of the reactant exhaust tube 38. The position of the exhaust port 36 with relation to the input locations of the chlorate and sulfur dioxide reactants respectively differs in two significant respects from most previous practices. Whereas, in the past, the reactant exhaust location has usually been adjacent to the sulfur dioxide input location, in the present invention it is remote therefrom such that all of the sulfur dioxide is subjected to maximum contact time with the chlorate before being exhausted from the reaction chamber. What is even more significant however is that, rather than the reactant exhaust being positioned below the sulfur dioxide input as has previously been practiced, it is positioned above it in an opposite relationship to the previous practice. This causes full chlorate flooding of the reaction chamber above the sulfur dioxide input which, in combination with the high degree of diffusion of the sulfur dioxide, maximizes the contact time and contact area of the two reactants for maximum efficiency.

Entry of the chlorate and sulfur dioxide reactants into the reaction chamber 12 is dependent upon the vacuum imposed upon the chamber, the imposition of such vacuum being necessary to force flow of chlorate through the variable restriction 18 and also being necessary to open the sulfur dioxide cutoff valve 28 because of its spring-biasing toward the closed position. Such vacuum is imposed through the reactant exhaust tube 38 under the influence of an eductor 40 receiving a highly pressurized flow of water from a pump 42. The flow rate of the chlorate and sulfur dioxide reactants in such a system is dependent upon the level of vacuum imposed by the eductor 40, which is in turn dependent upon the flow rate of water from pump 42 through the eductor. It will be noted that the pump 42 uses, as its sole source of water, the cooling water within the cooling jacket 14, thereby serving as the exhaust for the cooling water entering the jacket through entry port 44 and determining the flow rate of cooling water through the jacket. With this arrangement, the flow rates of the chlorate and sulfur dioxide respectively, and the flow rate of cooling water, are proportionally interdependent due to their respective cause-and-effect relationships with the eductor 40. Thus, if it is desired to increase production of chlorine dioxide by increasing the flow rate of the reactants, this would be accomplished by increasing the flow rate of the cooling water by opening variable restriction 46, thereby automatically providing more cooling capacity for the increased flow of reactants.

Chlorine dioxide is exhausted from the reaction chamber 12 through a chlorine dioxide exhaust port 48 located at the top of the reaction chamber. For industrial uses of the chlorine dioxide, such as bleaching, there is no reason why the chlorine dioxide exhaust port 48 cannot be connected to the same eductor 40 through which the spent reactants are exhausted from the chamber, thereby creating a mixture of water, chlorine dioxide and spent reactants for industrial use. Where, however, the chlorine dioxide is intended for water treatment so as to produce potable water, or for the treatment of foodstuffs, it is not desirable that the spent reactants be intermixed with the chlorine dioxide. For such applications, the arrangement shown in FIG. 1 is preferred whereby a second eductor 50 exhausts the chlorine dioxide separately, simultaneously forming a solution of the chlorine dioxide in pure water. For this application, a second pump 52 feeding the second eductor 50 is preferred.

In order to permit the use of sulfur dioxide in high concentration free of substantial dilution with air or nitrogen as has been practiced in the past, without also increasing the explosion hazard incident to "puffing" of the chlorine dioxide, a vacuum of at least about 400 millimeters Hg below atmospheric pressure is required, and preferably at least about 500 millimeters Hg of vacuum or higher. For a pair of eductors such as 40 and 50 to exhaust the chlorine dioxide separately from the spent reactants, this high level of vacuum requires much more careful balancing of the vacuums imposed by the two eductors than is necessary when using two eductors to impose a much lesser vacuum on a reaction chamber. The required balance can, however, be achieved by adjustment of the respective variable restrictions 46 and 54 in the eductor feed lines such that the flow rates therethrough as sensed by the flow meters 56 and 58 respectively are the same for two identically-sized eductors 40 and 50. The level of vacuum imposed by the two eductors in combination is sensed by a conventional vacuum gauge 60.

For best results, the interior of the reaction chamber 12 to the level of the reactant exhaust port 36 is filled with a suitable packing such as Raschig rings (not shown).

The effectiveness of the above-described method for producing chlorine dioxide by the interaction of chlorate and sulfur dioxide will be better understood from the following example.

EXAMPLE

Chlorine dioxide was generated by the reaction of an aqueous solution of sodium chlorate and gaseous sulfur dioxide in a reaction chamber having an inside diameter of 8.9 centimeters and a distance of 121.9 centimeters between the bottom of the chamber and the reactant exhaust port 36 (which determines the depth of solution in the chamber). A 40% by weight aqueous solution of sodium chlorate was fed to the chamber at a rate of 11,148.7 grams per hour (4459.5 grams per hour of sodium chlorate), while gaseous sulfur dioxide in undiluted form (100% concentration) was fed at the rate of 2553.8 grams per hour. A vacuum (negative pressure) of 584.2 millimeters Hg was maintained on the chamber throughout the generation process, and the temperature of the reaction chamber was maintained by the flow of coolant through the cooling jacket in a range between about 65° centigrade and about 71° centigrade. Chlorine dioxide was generated at the rate of 2810.3 grams per hour, for an efficiency of 99.6% of the theoretical yield based on chlorate.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for the continuous production of gaseous chlorine dioxide by the reaction between gaseous sulfur dioxide and an aqueous solution of a metallic chlorate, said apparatus comprising:

(a) a vertically-oriented reaction chamber;

(b) a source of an aqueous solution of a metallic chlorate and means for introducing said aqueous solution into the bottom of said reaction chamber;

(c) a source of gaseous sulfur dioxide and means for introducing said sulfur dioxide into the bottom of said reaction chamber and bringing said sulfur dioxide into contact with said aqeous solution;

(d) means for withdrawing from the top of said reaction chamber gaseous chlorine dioxide;

(e) means for withdrawing spent reactant liquors at an intermediate point of said reaction chamber;

(f) flow means for maintaining a flow of coolant liquid in contact with the exterior surface of said reaction chamber to remove heat from said reaction chamber;

(g) eductor means in fluid communication with the flow means, said eductor means also being in fluid communication with said reaction chamber for withdrawing chlorine dioxide and spent reactant liquors therefrom; and (h) means for conducting coolant liquid from said flow means through said eductor means so as to create a vacuum therein and cause said chlorine dioxide and spent reactant liquors to be withdrawn through said eductor means, so that a change of coolant liquid flow rate through the eductor induces a corresponding change in the rate of withdrawal of chlorine dioxide and spent reactant liquors from said reaction chamber.

2. The apparatus of claim 1 wherein said eductor means further comprises:

(a) means for variably regulating said flow of coolant through said eductor means; and (b) means for measuring the flow rate of said coolant.

3. An apparatus for the continuous production of gaseous chlorine dioxide by the reaction between gaseous sulfur dioxide and an aqueous solution of a metallic chlorate, said apparatus comprising:

(a) a vertically-oriented reaction chamber;

(b) a source of an aqueous solution of a metallic chlorate and means for introducing said aqueous solution into the bottom of said reaction chamber;

(c) a source of gaseous sulfur dioxide and means for introducing said sulfur dioxide into the bottom of said reaction chamber and bringing said sulfur dioxide into contact with said aqueous solution;

(d) means for withdrawing from the top of said reaction chamber gaseous chlorine dioxide;

(e) means for withdrawing spent reactant liquors at an intermediate point of said reaction chamber;

(f) flow means for maintaining a flow of coolant liquid in contact with the exterior surface of said reaction chamber to remove heat from said reaction chamber;

(g) eductor means in fluid communication with the flow means, said eductor means also being in fluid communication with said reaction chamber for withdrawing spent raectant liquors therefrom; and (h) means for conducting coolant liquid from said flow means through said eductor means so as to create a vacuum therein and cause said spent reactant liquors to be withdrawn through said eductor means, so that a change of coolant liquid flow rate through the eductor induces a corresponding change in the rate of withdrawal of said spent reactant liquors from said reaction chamber.

4. The apparatus of claim 3 wherein said eductor means further comprises:

(a) means for variably regulating said flow of coolant through said eductor means; and (b) means for measuring the flow rate of said coolant.

5. The apparatus of claim 4 wherein said means for withdrawing gaseous chlorine dioxide comprises second eductor means separate from eductor means for withdrawing spent reactant liquors, and means for conducting a liquid through said second eductor means to withdraw said gaseous chlorine dioxide.

6. The apparatus of claim 5 wherein said second eductor means for withdrawing chlorine dioxide further comprises:

(a) means for introducing a flow of liquid through said second eductor means so as to enable said second eductor means to apply a vacuum to the interior of said reaction chamber;

(b) means for variably regulating said flow of liquid through said second eductor means; and (c) means for measuring the flow rate of liquid.

* * * * *